(12) United States Patent
Choi et al.

(10) Patent No.: US 11,409,151 B2
(45) Date of Patent: Aug. 9, 2022

(54) LIQUID CRYSTAL DISPLAY

(71) Applicant: SAMSUNG ELECTRONICS CO., LTD., Suwon-si (KR)

(72) Inventors: Yoonsun Choi, Yongin-si (KR); Chanhee Lee, Seongnam-si (KR); Teahong Min, Seoul (KR); Jinho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/984,830

(22) Filed: Aug. 4, 2020

(65) Prior Publication Data

US 2021/0063815 A1 Mar. 4, 2021

(30) Foreign Application Priority Data

Aug. 29, 2019 (KR) .................. 10-2019-0106762

(51) Int. Cl.
| | |
|---|---|
| G02F 1/1333 | (2006.01) |
| G02F 1/1335 | (2006.01) |
| G02B 27/01 | (2006.01) |

(52) U.S. Cl.
CPC ....... *G02F 1/133382* (2013.01); *G02B 27/01* (2013.01); *G02F 1/133528* (2013.01); *G02B 2027/0181* (2013.01)

(58) Field of Classification Search
None
See application file for complete search history.

(56) References Cited

U.S. PATENT DOCUMENTS

| | | | |
|---|---|---|---|
| 6,920,043 B1 | 7/2005 | Ishikawa et al. | |
| 2012/0075563 A1* | 3/2012 | Takeda | G02F 1/133377 |
| | | | 349/139 |
| 2018/0157094 A1* | 6/2018 | Lee | G02F 1/133602 |

FOREIGN PATENT DOCUMENTS

| | | |
|---|---|---|
| JP | 9-113158 A | 5/1997 |
| JP | 2008-198860 A | 8/2008 |
| JP | 2008234841 A  * | 10/2008 |
| JP | 2018-087775 A | 6/2018 |

(Continued)

OTHER PUBLICATIONS

English translation of JP-2008234841-A, Title: Light-Emitting Device, Author: Kubota, Takehiko; Date of publication: Oct. 2, 2008 (Year: 2008).*

(Continued)

*Primary Examiner* — Shan Liu
(74) *Attorney, Agent, or Firm* — Sughrue Mion, PLLC

(57) ABSTRACT

Provided a liquid crystal display (LCD) including a backlight unit, a lower polarizing plate provided on the backlight unit, a lower glass substrate provided on the lower polarizing plate, a plurality of thin-film transistors provided on the lower glass substrate, a liquid crystal layer provided on the plurality of thin-film transistors, the liquid crystal layer including a plurality of liquid crystal cells spaced apart from each other in a lattice structure and respectively corresponding to the plurality of thin-film transistors, a color filter provided on the liquid crystal layer, an upper glass substrate provided on the color filter, an upper polarizing plate provided on the upper glass substrate, and a heat release structure configured to externally release thermal energy of the LCD.

6 Claims, 15 Drawing Sheets

(56) References Cited

FOREIGN PATENT DOCUMENTS

| KR | 20-0225459 Y1 | | 6/2001 |
|---|---|---|---|
| KR | 20-0347118 Y1 | | 4/2004 |
| KR | 200370811 Y1 | * | 12/2004 |
| KR | 20-0401354 Y1 | | 11/2005 |
| KR | 20060112811 A | * | 11/2006 |
| KR | 10-2009-0061391 A | | 6/2009 |

OTHER PUBLICATIONS

English translation of KR-20060112811-A, Title: A Plasma Display Device, Author: Kim Sok San; Kang Tae Kyoung; Date of publication: Nov. 2, 2006 (Year: 2006).*

English translation of KR-200370811-Y1, Title: LCD Module, Author: Jeong Do-hyeon, Park Seung-ik, Kim Do-young, Lee Byung-hoon; Date of publication: Dec. 18, 2004 (Year: 2004).*

* cited by examiner

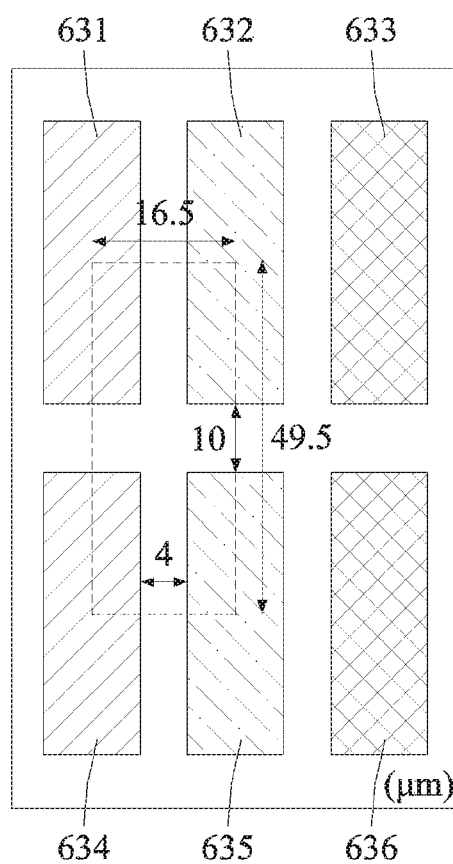

LIQUID CRYSTAL DISPLAY

CROSS-REFERENCE TO RELATED APPLICATION

This application claims priority from Korean Patent Application No. 10-2019-0106762 filed on Aug. 29, 2019, in the Korean Intellectual Property Office, the disclosure of which is incorporated herein by reference in its entirety.

BACKGROUND

1. Field

Methods and apparatuses consistent with example embodiments relate to a method of cooling heat generated in a liquid crystal display (LCD).

2. Description of Related Art

A head-down display (HDD) may provide a driver who is driving a vehicle with an image to be displayed in a direction below a viewing point of the driver. On the other hand, a head-up display (HUD) may provide the driver with an image to be displayed in a direction of the viewing point of the driver. The HUD may thus be less distracting to the viewing point of the driver, and improve convenience and safety of the driver. The HUD may adjust an output image using a lens. However, through the lens, external light may be concentrated on a liquid crystal display (LCD). Thus, there is a desire for technology for cooling heat generated in an LCD.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a liquid crystal display (LCD) including a backlight unit, a lower polarizing plate provided on the backlight unit, a lower glass substrate provided on the lower polarizing plate, a plurality of thin-film transistors provided on the lower glass substrate, a liquid crystal layer provided on the plurality of thin-film transistors, the liquid crystal layer including a plurality of liquid crystal cells spaced apart from each other in a lattice structure and respectively corresponding to the plurality of thin-film transistors, a color filter provided on the liquid crystal layer, an upper glass substrate provided on the color filter, an upper polarizing plate provided on the upper glass substrate, and a heat release structure configured to externally release thermal energy of the LCD.

The heat release structure may correspond to the lattice structure of the plurality of liquid crystal cells.

The heat release structure may be provided on the upper polarizing plate or provided between the lower polarizing plate and the backlight unit.

The LCD may further include at least one of a heat-releasing fin, a heat-releasing fan, and a heat pipe, wherein the heat release structure is connected to the at least one of the heat-releasing fin, the heat-releasing fan, and the heat pipe.

The LCD may further include a heat-releasing fin and a heat pipe, wherein the heat release structure is connected to the heat-releasing fin and the heat pipe.

The LCD may further include a heat-releasing fin, and a heat-releasing fan, wherein the heat release structure is connected to the heat-releasing fin and the heat-releasing fan.

The LCD may further include a heat-releasing fan, and a heat pipe, wherein the heat release structure is connected to the heat-releasing fan and the heat pipe.

The LCD may further include a heat-releasing fin, a heat-releasing fan, and a heat pipe, wherein the heat release structure is connected to the heat-releasing fin, the heat-releasing fan, and the heat pipe.

The heat release structure may be formed of copper, indium tin oxide, or graphene.

According to another aspect of an example embodiment, there is provided a liquid crystal display (LCD) including a backlight unit, a lower polarizing plate provided on the backlight unit, a lower glass substrate provided on the lower polarizing plate, a plurality of thin-film transistors provided on the lower glass substrate, a liquid crystal layer provided on the plurality of thin-film transistors, the liquid crystal layer including a plurality of liquid crystal cells spaced apart from each other in a lattice structure and respectively corresponding to the plurality of thin-film transistors, a color filter provided on the liquid crystal layer, an upper glass substrate provided on the color filter, an upper polarizing plate provided on the upper glass substrate, and a heat release structure provided on the upper polarizing plate or provided between the upper polarizing plate and the lower polarizing plate, the heat release structure being configured to release thermal energy of the LCD.

The heat release structure may correspond to and overlaps a space between the plurality of liquid crystal cells in the lattice structure.

The heat release structure may be formed of copper, indium tin oxide, or graphene.

The LCD may further include at least one of a heat-releasing fin, a heat-releasing fan, and a heat pipe.

The heat release structure may be connected to at least one of the at least one of the heat-releasing fin, the heat-releasing fan, and the heat pipe.

The LCD may further include a heat-releasing fin and a heat pipe, wherein the heat release structure is connected to the heat-releasing fin and the heat pipe.

The LCD may further include a heat-releasing fin, and a heat-releasing fan, wherein the heat release structure is connected to the heat-releasing fin and the heat-releasing fan.

The LCD may further include a heat-releasing fan, and a heat pipe, wherein the heat release structure is connected to the heat-releasing fan and the heat pipe.

The LCD may further include a heat-releasing fin, a heat-releasing fan, and a heat pipe, wherein the heat release structure is connected to the heat-releasing fin, the heat-releasing fan, and the heat pipe.

The heat release structure may be provided on the upper polarizing plate opposite to the backlight unit.

The heat release structure may be provided between the upper polarizing plate and the lower polarizing plate.

BRIEF DESCRIPTION OF THE DRAWINGS

The above and/or other aspects will be more apparent by describing example embodiments, taken in conjunction with the accompanying drawings, in which:

FIG. 6B is a planar view illustrating an example of a gap between liquid crystal cells to verify a heat-releasing effect of an LCD according to an example embodiment;

DETAILED DESCRIPTION

Figure 1A:
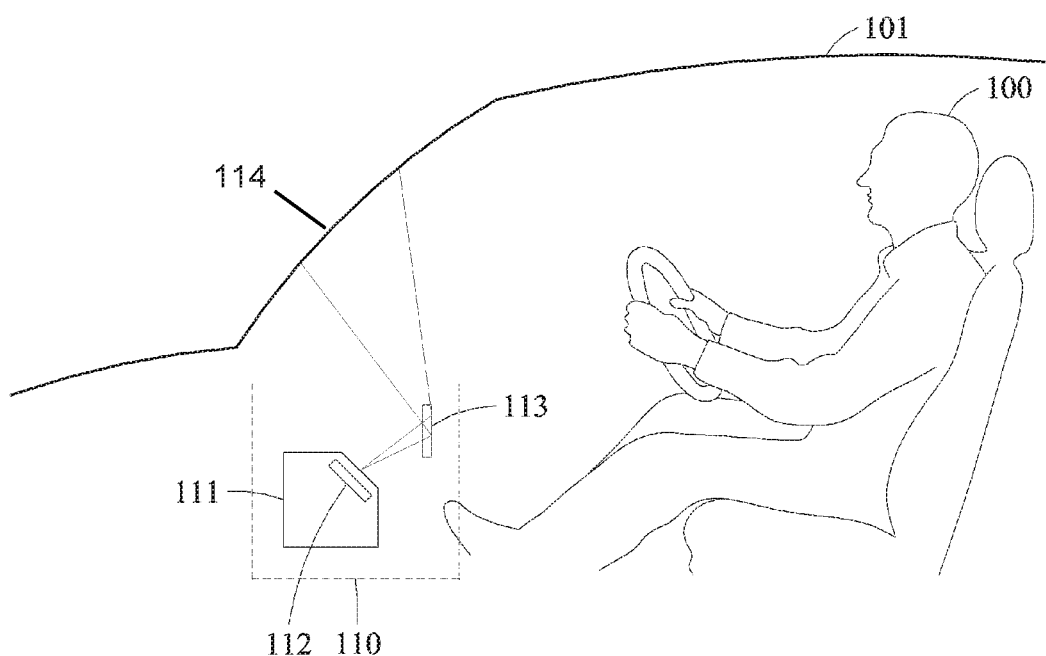
FIG. 1A illustrates an example of a situation in which a head-up display (HUD) including a liquid crystal display (LCD) is used when a driver drives a vehicle according to an example embodiment.

Example embodiments will now be described in detail with reference to the accompanying drawings, wherein like reference numerals refer to the like elements throughout.

The following structural or functional descriptions are exemplary to merely describe the example embodiments, and the scope of the example embodiments is not limited to the descriptions provided in the present disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the example embodiments of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout. Also, in the description of example embodiments, detailed description of structures or functions that are thereby known after an understanding of the disclosure of the present application will be omitted when it is deemed that such description will cause ambiguous interpretation of the example embodiments.

Hereinafter, example embodiments will be described in relation to a liquid crystal display (LCD) used for a head-up display (HUD) of a vehicle. However, the LCD is provided merely as an example for convenience of description, and thus the example embodiments may be applicable to another technical field. In addition, an LCD according to an example embodiment may be applicable to a device other than a HUD.

FIG. 1A illustrates an example of a HUD including an LCD being used when a driver drives a vehicle according to an example embodiment.

An HUD 110 displays an image on a windshield 114 of a vehicle 101. Through the HUD 110, the image may be naturally provided to a viewing point of a driver, or a user 100 without an obstacle therebetween. The HUD 110 may be embodied in a projection type. A projection-type HUD may provide an image of the HUD by projecting the image to a screen. The projection-type HUD may include a display engine configured to provide HUD image information, an optical projection system, an optical expansion system, and a screen to which a HUD image is projected. The display engine may include a display, a processor configured to operate the display, and a memory configured to store the HUD image information. The HUD may include an LCD, and the screen may include a windshield 114 or a combiner.

In FIG. 1A, the HUD 110 displays the image on the windshield 114 through an image output device 111 and an optical device 113. The image output device 111 outputs the image through an LCD 112. The image output through the LCD 112 is adjusted to a form suitable for the user 100 to view through the optical device 113. The image of the adjusted form is displayed on the windshield 114 of the vehicle 101. Thus, the user 100 of the vehicle 101 obtains information necessary for driving through the windshield 114 disposed on a path of the corresponding viewing point of the user 100, while maintaining a natural viewing point facing a front side of the vehicle 101 while driving the vehicle 101. The image of the HUD 110 is projected to the windshield 114, and the user 100 views the image reflected from a surface of the windshield 114.

The optical device 113 includes at least one lens. The lens is configured to adjust a size of an image to be output. However, in terms of external light, the lens may be a contributing factor to concentration of external light. For example, external light may be concentrated on one point of the LCD 112 through the lens, and thus a temperature of the LCD 112 may increase. In addition, as a field of view (FOV) increases, an amount of external light to be absorbed by the LCD 112 may increase, and thus the temperature may increase. In addition, the LCD 112 includes a backlight unit (BLU). A liquid crystal layer included in the LCD 112 may not be capable of emitting light, and thus may receive light through the BLU. Thus, the temperature of the LCD 112 may increase also by the BLU.

In an example, the LCD 112 includes a heat release structure, and may thus have a higher heat-releasing effect. The LCD 112 includes the heat release structure, and may thus achieve a constant heat-releasing effect irrespective of an increase in an FOV. The LCD 112 includes the heat release structure that has a relatively high level of thermal conductivity, and may thus have a relatively higher heat-releasing effect compared to a heat release structure only using a heat pipe with a relatively low level of thermal conductivity. Compared to a thermally conductive transparent film used to release heat of an LCD, which has a limited heat-releasing effect due to a trade-off relationship between thermal conductivity and transmittance in which an increase in the thermal conductivity results in a decrease in the transmittance and an increase in the transmittance results in a decrease in the thermal conductivity, the LCD 112 may not have such trade-off relationship, and may thus have a relatively higher heat-releasing effect without degrading transmittance.

In an example, the heat release structure of the LCD 112 may be embodied in a same structure as a black matrix of the liquid crystal layer. When the heat release structure overlaps the black matrix, the heat release structure may not obstruct light emitted from a liquid crystal cell. Thus, as the heat release structure may be disposed to overlap the black matrix, the LCD 112 may increase the heat-releasing effect while maintaining the transmittance.

The heat release structure may be a metal mesh. The heat release structure may be formed of all types of material having a thermal conductivity that is equal to or greater than a certain value, in addition to metal. For example, the heat release structure may be formed of copper with thermal conductivity of 400 watts per meter-Kelvin (W/mk), indium tin oxide (ITO) with thermal conductivity of 12 W/mk, or graphene with thermal conductivity of 500 W/mk. However, embodiments are not limited thereto.

According to an example embodiment, the heat release structure may be combined with or connected to an existing heat-releasing device, and thus may have a higher heat-releasing effect. For example, the heat release structure may be combined with or connected to a heat-releasing fin, a heat-releasing fan, or a heat pipe. The heat release structure may be combined with or connected to the heat-releasing fin, the heat-releasing fan, or the heat pipe, and may thus externally release heat of the LCD 112 more rapidly.

Figure 1B:
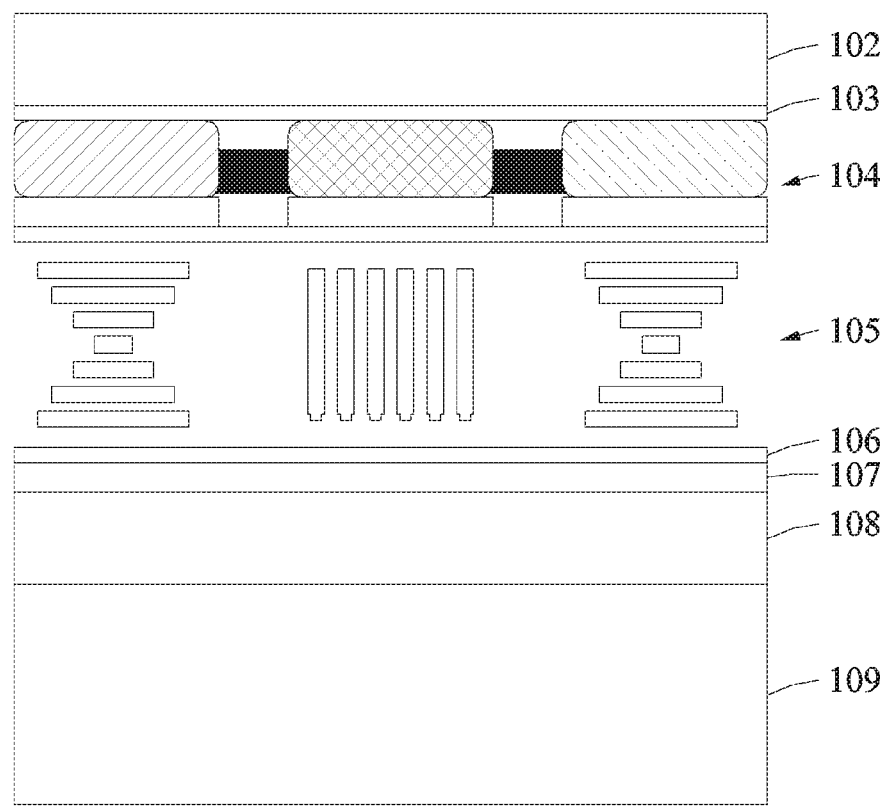
FIG. 1B illustrates an example of an LCD according to an example embodiment.

FIG. 1B illustrates an example of an LCD according to an example embodiment.

Referring to FIG. 1B, an LCD includes an upper polarizing plate 102, an upper glass substrate 103, a color filter 104, a liquid crystal layer 105, a thin-film transistor layer 106, a lower glass substrate 107, a lower polarizing plate 108, and a BLU 109. The LCD may further include a heat release structure.

The heat release structure may release thermal energy of the LCD to an outside. The heat release structure may be disposed on the upper polarizing plate 102, or under the lower polarizing plate 108. However, embodiments are not limited thereto. For example, the heat release structure may be disposed between the upper polarizing plate 102 and the lower polarizing plate 108. Through the heat release structure, the LCD may have a relatively high heat-releasing effect irrespective of an increase in an FOV. In addition, through the heat release structure, the LCD may have a relatively high heat-releasing effect without a loss of transmittance.

The liquid crystal layer 105 includes a plurality of liquid crystal cells. The liquid crystal cells are disposed separate from each other in a lattice structure. The plurality of liquid crystal cells included in the liquid crystal layer 105 includes liquid crystal molecules. The liquid crystal layer 105 includes spaces disposed separate from each other between the liquid crystal cells. Such separate spaces may be disposed in the lattice structure. In these separately disposed spaces, opaque components such as, for example, a conducting wire, may be disposed. The spaces separately disposed between the liquid crystal cells may be a black matrix.

The thin-film transistor layer 106 includes a plurality of thin-film transistors which respectively corresponds to the plurality of liquid crystal cells.

The color filter 104 includes, for example, a red (R), green (G), blue (B) color filter. The color filter 104 may convert light passing through the liquid crystal layer 105 to a color.

Figure 2A:
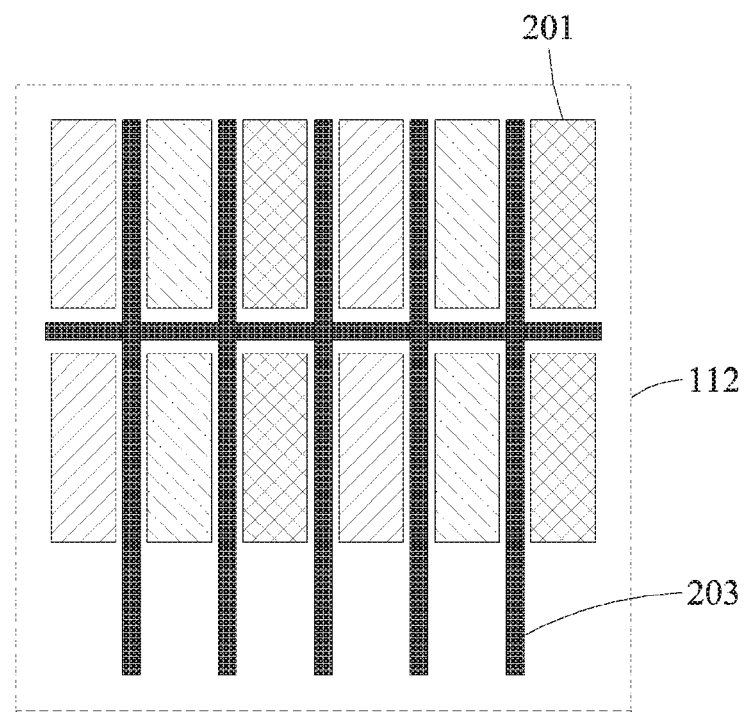
FIG. 2A is a planar view illustrating an example of an LCD including a heat release structure according to an example embodiment.
Figure 2B:
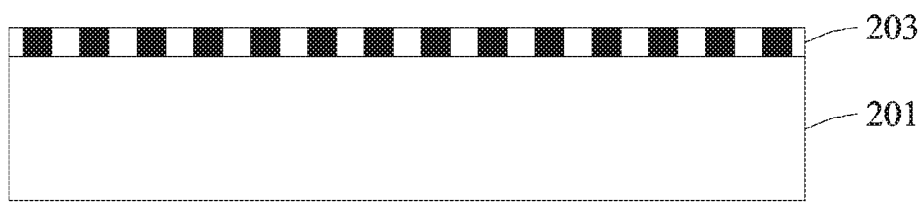
FIGS. 2B and 2C are side views illustrating examples of an LCD including a heat release structure according to an example embodiment.
Figure 2C:
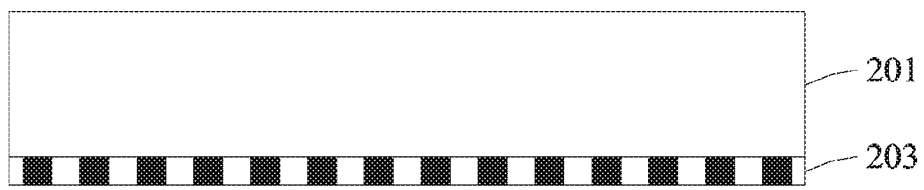

FIG. 2A is a planar view illustrating an example of an LCD including a heat release structure according to an example embodiment. FIGS. 2B and 2C are side views illustrating two examples of an LCD including a heat release structure according to an example embodiment.

Referring to FIG. 2A, an LCD 112 includes a heat release structure 203. The heat release structure 203 matches a lattice structure in which a plurality of liquid crystal cells 201 is arranged. As the heat release structure 203 is disposed to overlap a black matrix, the LCD 112 may increase a heat-releasing effect while maintaining transmittance.

Although FIG. 2A illustrates the heat release structure 203 completely overlapping the black matrix, a heat release structure of an LCD may be provided in various forms while being included in a black matrix. The number of mesh cells of the heat release structure 203 may be less than or equal to the number of the liquid crystal cells 201. Herein, a liquid crystal cell may be a pixel. A gap or a distance between the mesh cells of the heat release structure 203 may be equal to a gap or a distance between pixels, or a multiple of the gap or distance between the pixels. Thus, the heat release structure 203 may overlap the black matrix.

FIGS. 2B and 2C are side views of an LCD including a heat release structure 203 and a plurality of liquid crystal cells 201. Referring to FIG. 2B, the heat release structure 203 may be disposed on the plurality of liquid crystal cells 201, in a direction receding away from a BLU.

Referring to FIG. 2C, the heat release structure 203 may also be disposed under the plurality of liquid crystal cells 201, in a direction facing the BLU.

Figure 3:
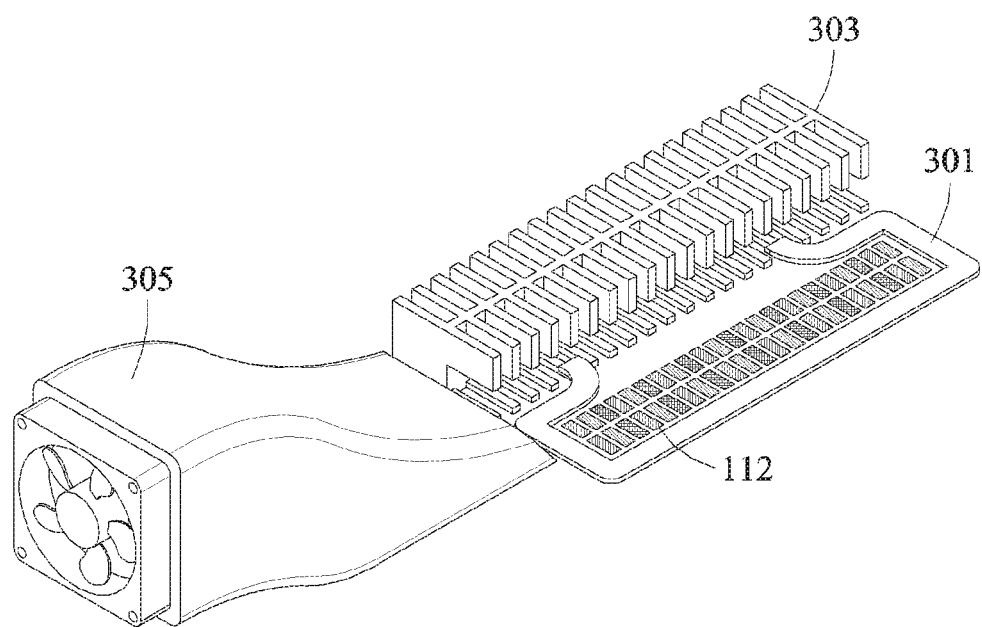
FIG. 3 is a diagram illustrating an example of a connection of an LCD and various heat release structures according to example embodiments.
Figure 4A:
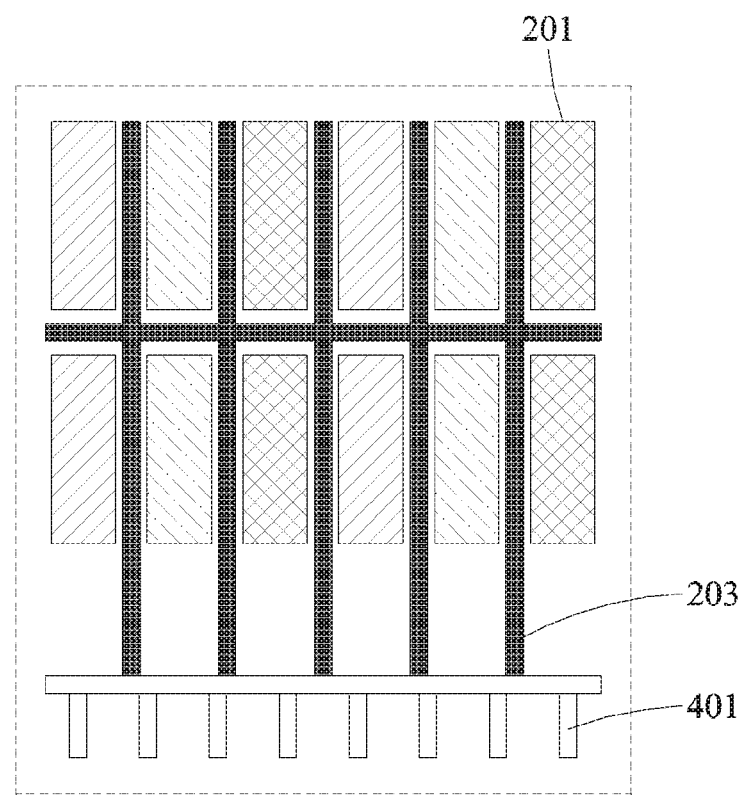
FIG. 4A is a planar view illustrating an example of a connection of an LCD and a heat-releasing fin according to another example embodiment.
Figure 4B:
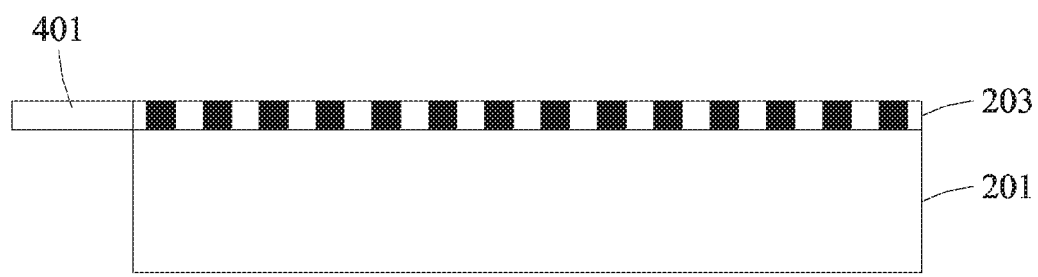
FIGS. 4B and 4C are side views illustrating examples of a connection of an LCD and a heat-releasing fin according to other example embodiments.
Figure 4C:
Figure 5A:
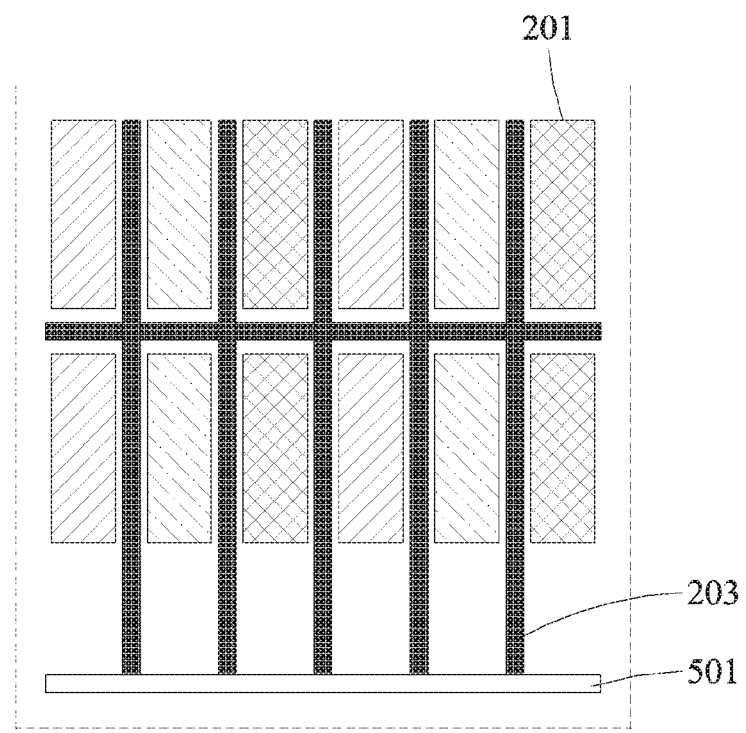
FIG. 5A is a planar view illustrating an example of a connection of an LCD and a heat pipe according to still another example embodiment.
Figure 5B:
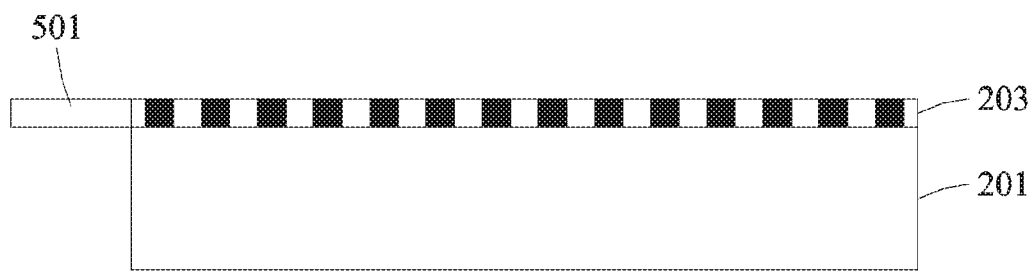
FIGS. 5B and 5C are side views illustrating examples of a connection of an LCD and a heat pipe according to still other example embodiments.
Figure 5C:
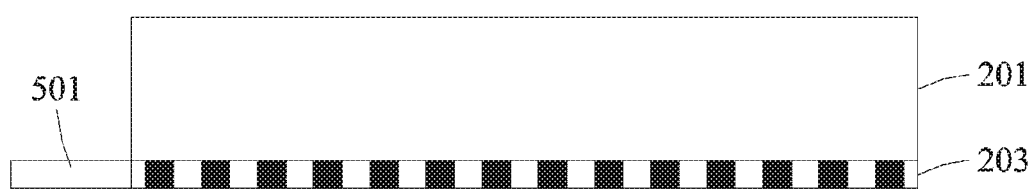

FIG. 3 is a diagram illustrating an example of a connection of an LCD and various heat release structures according to example embodiments. FIG. 4A is a planar view illustrating an example of a connection of an LCD and a heat-releasing fin according to another example embodiment. FIGS. 4B and 4C are side views illustrating examples of a connection of an LCD and a heat-releasing fin according to other example embodiments. FIG. 5A is a planar view illustrating an example of a connection of an LCD and a heat pipe according to still another example embodiment. FIGS. 5B and 5C are side views illustrating examples of a connection of an LCD and a heat pipe according to still other example embodiments.

Referring to FIG. 3, an LCD 112 may be combined with or connected to various heat release structures. The heat release structures combined or connected to the LCD 112 may cool off heat of the LCD 112.

The LCD 112 may include a heat-releasing fan 305, a heat-releasing fin 303, and/or a heat pipe 301. The LCD 112 may include all of the heat-releasing fan 305, the heat-releasing fin 303, and the heat pipe 301, or selectively include the heat-releasing fan 305, the heat-releasing fin 303, or the heat pipe 301. A combination thereof illustrated in FIG. 3 is provided as an example, and the heat-releasing fan 305, the heat-releasing fin 303, and/or the heat pipe 301 may be arranged in various ways. For example, the heat-releasing fan 305, the heat-releasing fin 303, or the heat pipe 301 may be connected to a metal structure, or a heat release structure herein, in series or in parallel. For example, the metal structure may be connected to the heat pipe 301, the heat pipe 301 may be connected to the heat-releasing fin 303, and the heat-releasing fin 303 may be connected to the heat-releasing fan 305.

The heat pipe 301 may be a pipe having a hole therein. The heat pipe 301 may have a plurality of small holes therein, and thus have a space through which a component may pass therein. This space may be filled with a volatile liquid. When one end of the heat pipe 301 is heated, the volatile liquid may evaporate into gas. The volatile liquid evaporated into gas absorbs thermal energy, and moves to an opposite side of the one end to which heat is applied. The gas moved to the other end of the heat pipe 301 releases heat, and the gas having a temperature reduced as the heat is released liquefies again into liquid to return to an original position after passing the heat pipe 301.

The heat-releasing fin 303 may be an air-cooling heat-releasing device, and have a higher heat-releasing effect when an area in contact with air increases because heat may be released more rapidly. The heat-releasing fin 303 may be formed of metal with a relatively high thermal conductivity, such as, for example, aluminum and copper, and may thus increase a heat-releasing effect.

The heat-releasing fan 305 may be a heat-releasing device configured to circulate air and force heat of the LCD 112 to be externally released, with power supplied.

In an example, the heat release structure of the LCD 112 may include the heat-releasing fan 305, the heat-releasing fin 303, and the heat pipe 301. In another example, the heat release structure of the LCD 112 may include the heat-releasing fan 305 and the heat-releasing fin 303. In still another example, the heat release structure of the LCD 112 may include the heat-releasing fan 305 and the heat pipe 301. In yet another example, the heat release structure of the LCD 112 may include the heat-releasing fin 303 and the heat pipe 301.

Referring to FIG. 4A, the LCD 112 includes a plurality of liquid crystal cells 201, a heat release structure 203, and a heat-releasing fin 401. FIG. 4B illustrates a side view of the LCD 112 including the heat release structure 203, the liquid crystal cells 201, and the heat-releasing fin 401. Referring to FIG. 4B, the heat release structure 203 and the heat-releasing fin 401 may be combined with or connected to each other, and disposed on the liquid crystal cells 201. Alternatively, referring to FIG. 4C, the heat release structure 203 and the heat-releasing fin 401 may be combined with or connected to each other, and disposed under the liquid crystal cells 201.

Referring to FIG. 5A, the LCD 112 includes a plurality of liquid crystal cells 201, a heat release structure 203, and a heat pipe 501. FIGS. 5B and 5C illustrate side view of the LCD 112 including the heat release structure 203, the liquid crystal cells 201, and the heat pipe 501. Referring to FIG. 5B, the heat release structure 203 and the heat pipe 501 may be combined with or connected to each other, and disposed on the liquid crystal cells 201. However, embodiments are not limited thereto. Alternatively, referring to FIG. 5C, the heat release structure 203 and the heat pipe 501 may be combined with or connected to each other, and disposed under the liquid crystal cells 201.

Figure 6A:
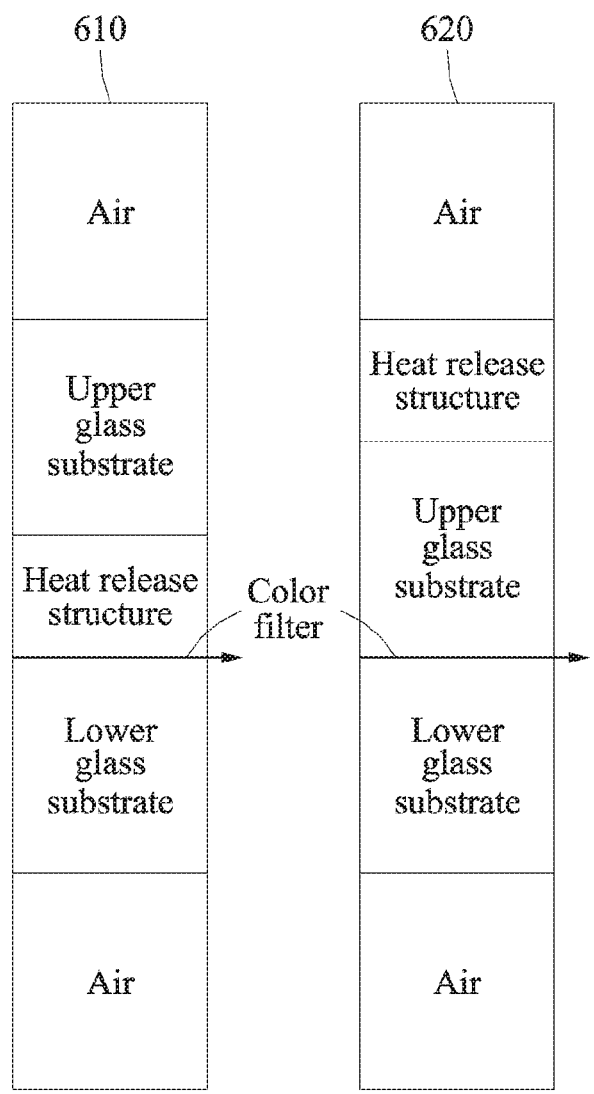
FIG. 6A is a diagram illustrating examples of two arrangements of a heat release structure to verify a heat-releasing effect of an LCD according to an example embodiment.
Figure 6C:
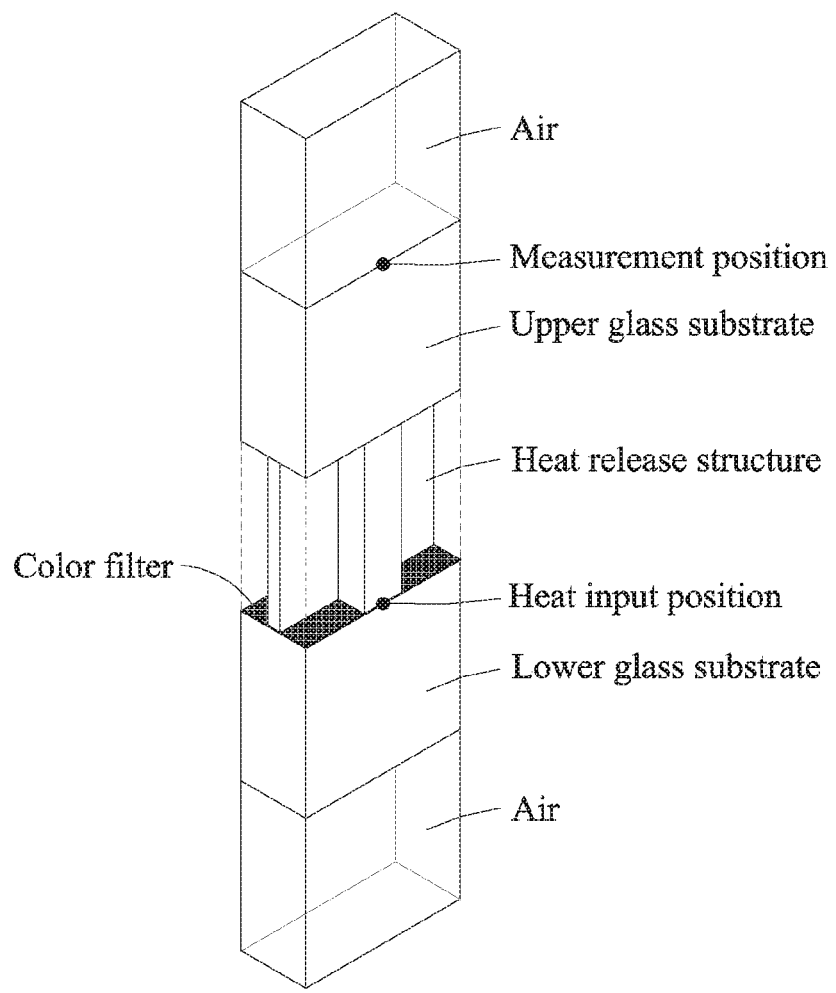
FIG. 6C is a perspective view illustrating an example of a desirable arrangement of a heat release structure to verify a heat-releasing effect of an LCD according to an example embodiment.
Figure 6D:
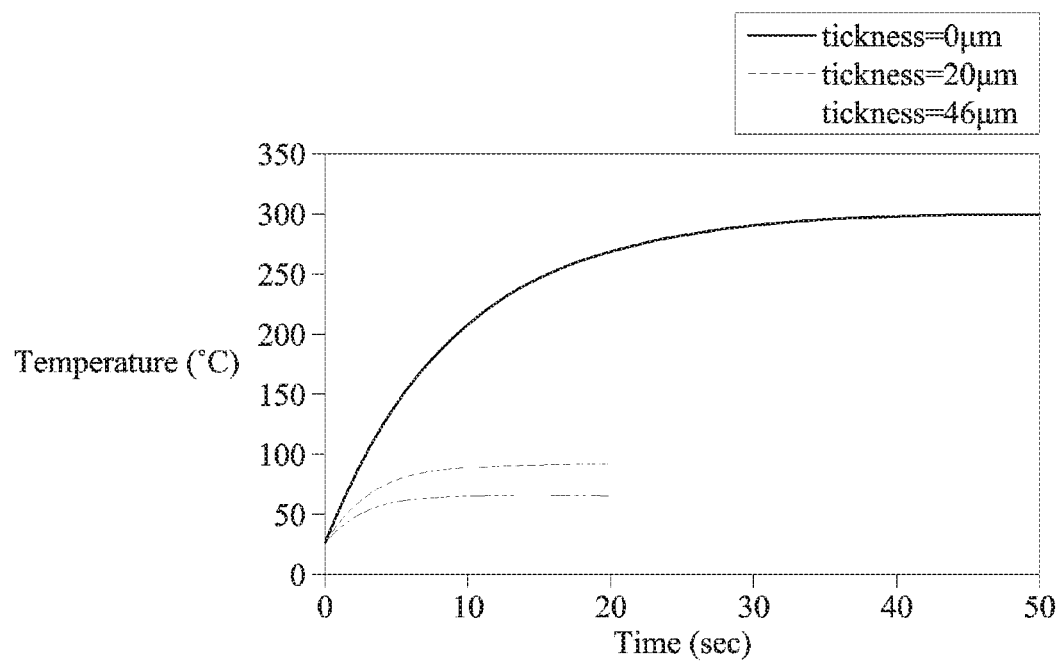
FIG. 6D is a graph illustrating an example of a change in temperature based on a thickness of a heat release structure of the LCD of FIG. 6C.
Figure 6E:
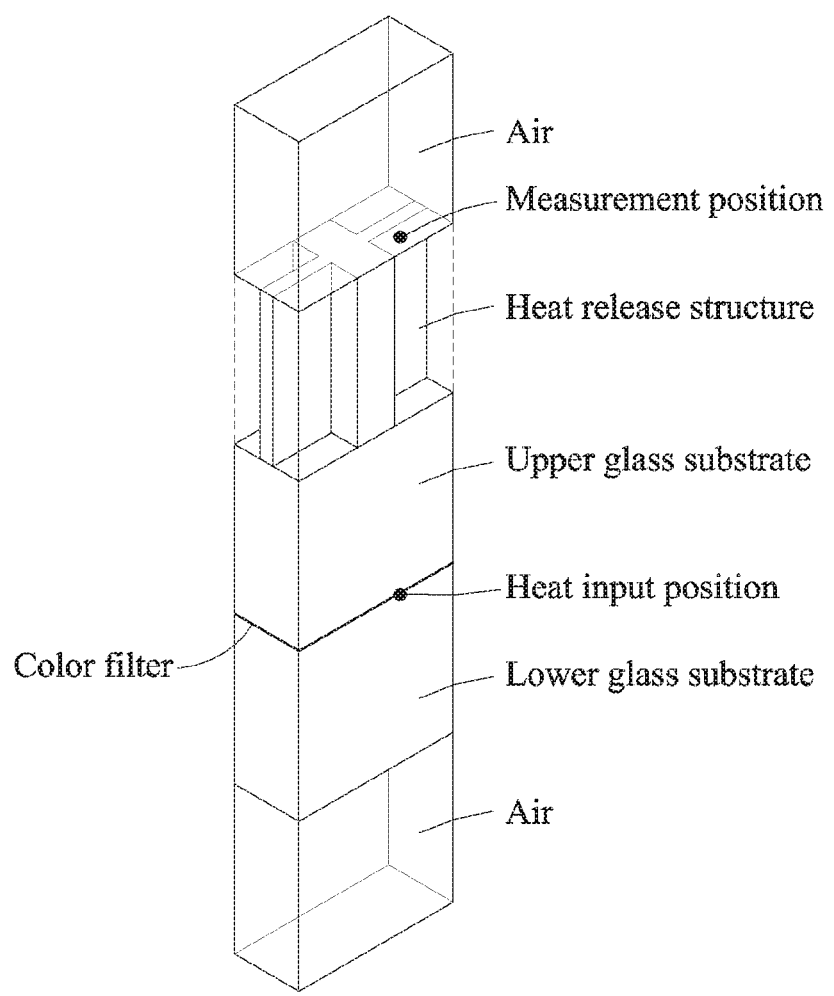
FIG. 6E is a perspective view illustrating an example of an arrangement of a heat release structure to verify a heat-releasing effect of an LCD according to an example embodiment.
Figure 6F:
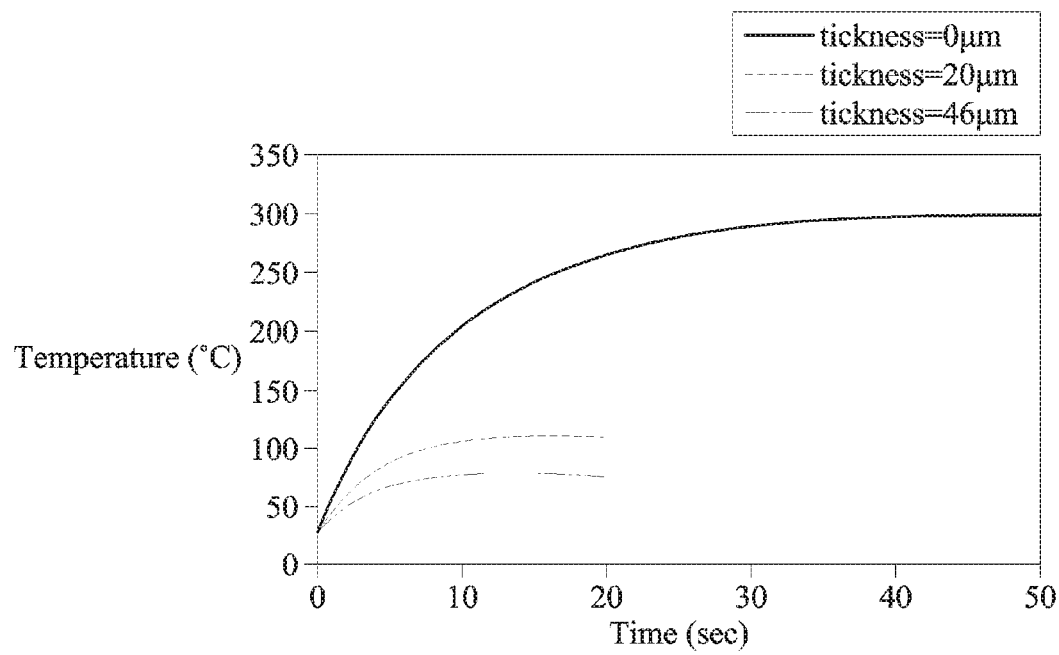
FIG. 6F is a graph illustrating an example of a change in temperature based on a thickness of a heat release structure of the LCD of FIG. 6E.

FIG. 6A is a diagram illustrating examples of two arrangements of a heat release structure according to example embodiments. FIG. 6B is a planar view illustrating an example of a gap between liquid crystal cells according to an example embodiment. FIG. 6C is a perspective view illustrating an example of an arrangement of a heat release structure according to an example embodiment. FIG. 6D is a graph illustrating an example of a change in temperature based on a thickness of a heat release structure of an LCD of FIG. 6C. FIG. 6E is a perspective view illustrating an example of an arrangement of a heat release structure according to another example embodiment. FIG. 6F is a graph illustrating an example of a change in temperature based on a thickness of a heat release structure of an LCD of FIG. 6E.

FIG. 6A illustrates a vertical arrangement 610 in which a heat release structure is disposed between an upper glass substrate and a lower glass substrate. The arrangement 610 may be desirable, and provided as an example for comparison to an example of an arrangement 620. A color filter is disposed between the heat release structure, or a metal structure, and the lower glass substrate. A temperature is measured in the color filter. In the arrangement 620, the heat release structure is disposed on the upper glass substrate.

TABLE 1

|  | Thickness (μm) | Conductivity (W/mk) | Density (Kg/m³) | Specific heat (J/KgK) |
| --- | --- | --- | --- | --- |
| Air | 50 | 0.025 | 1.239 | 718 |
| Glass substrate | 50 | 1.06 | 2510 | 720 |
| Color filter | 1 | 1.06 | 2510 | 720 |
| Metal structure (Cu) | 0, 20, 46 | 400 | 8960 | 380 |

Table 1 illustrates thickness, conductivity, density, and specific heat of air, the glass substrate, the color filter, and the metal structure. Respective thicknesses of air, a glass substrate, and a color filter are indicated as in Table 1. The thickness of the heat release structure of copper is changed between 0, 20, and 46 micrometers (μm). Here, the thickness being 0 indicates the absence of the heat release structure.

Referring to FIG. 6B, in the arrangement 610 and the arrangement 620, the heat release structure may be disposed among a plurality of liquid crystal cells 631, 632, 633, 634, 635, and 636 in a planar manner. A horizontal gap or distance between centers of the liquid crystal cells 631, 632, 633, 634, 635, and 636 may be set as 16.5 μm, and a vertical gap or distance between the centers of the liquid crystal cells 631, 632, 633, 634, 635, and 636 may be set as 49.5 μm. In addition, a horizontal gap or distance between the liquid crystal cells 631, 632, 633, 634, 635, and 636 may be set as 4 μm, and a vertical gap or distance between the liquid crystal cells 631, 632, 633, 634, 635, and 636 may be set as 10 μm.

FIG. 6C illustrates a position in the arrangement 610 to which heat is input, and a position in the arrangement 610 from which a temperature is measured according to an example embodiment. The heat is supplied to a position of the color filter disposed between the heat release structure and the lower glass substrate. The temperature is measured from the upper glass substrate.

FIG. 6D is a graph illustrating an example of a change in temperature based on a change in the thickness of the heat release structure of the LCD of FIG. 6C. Referring to FIG. 6D, as a thickness of the heat release structure of copper changes to 0 μm, 20 μm, and 46 μm, a change in the temperature as time passes decreases.

FIG. 6E illustrates a position in the arrangement 620 to which heat is input, and a position in the arrangement 620 from which a temperature is measured according to an example. The heat is supplied to a position of the color filter disposed between the heat release structure and the lower glass substrate. The temperature is measured from the heat release structure.

FIG. 6F is a graph illustrating an example of a change in temperature based on a thickness of the heat release structure of the LCD of FIG. 6E. Referring to FIG. 6F, as a thickness of the heat release structure of copper changes between 0 μm, 20 μm, and 46 μm, a temperature change measured as time passes decreases.

TABLE 2

| Thickness (μm) of metal structure | Temperature (° C.) | |
|---|---|---|
| | Case 1 | Case 2 |
| 0 | 300 | 300 |
| 20 | 92.5 | 112.4 |
| 46 | 66.4 | 76.2 |

Table 2 above indicates temperatures measured as the thickness of the heat release structure of copper changes between 0 μm, 20 μm, and 46 μm. In Table 2, Case 1 indicates the arrangement 610 and Case 2 indicates the arrangement 620. Referring to Table 2, Case 1 where the heat release structure is disposed between the upper glass substrate and the lower glass substrate has a relatively higher heat-releasing effect compared to Case 2. Although Case 2 where the heat release structure is disposed outside the glass substrates has a lower heat-releasing effect compared to Case 1, Case 2 has a distinct cooling effect as the thickness of the heat release structure increases, compared to the thickness of the heat releasing structure being 0 or the absence of the heat release structure.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor (e.g., a central processing unit (CPU)), a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processor(s).

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

While example embodiments have been described with reference to the figures, it will be apparent to one of ordinary skill in the art that various changes in form and details may be made in these examples without departing from the spirit and scope of the claims and their equivalents.

What is claimed is:

1. A liquid crystal display (LCD) comprising:
a backlight unit;
a lower polarizing plate provided on and above the backlight unit;
a lower glass substrate provided on and above the lower polarizing plate;
a plurality of thin-film transistors provided on the lower glass substrate;
a liquid crystal layer provided on the plurality of thin-film transistors and above the lower glass substrate, the liquid crystal layer comprising a plurality of liquid crystal cells spaced apart from each other in a lattice structure and respectively corresponding to the plurality of thin-film transistors;
a color filter provided on the liquid crystal layer;
an upper glass substrate provided on the color filter and above the liquid crystal layer;
an upper polarizing plate provided on and above the upper glass substrate;
a heat release structure configured to externally release thermal energy of the LCD, and
at least one of a heat-releasing fin, a heat-releasing fan, and a heat pipe,
wherein the heat release structure is provided under the lower polarizing plate, comprises mesh cells to match the lattice structure in which the plurality of liquid crystal cells is arranged, and overlaps a space between the plurality of liquid crystal cells in the lattice structure in a plan view, and
wherein the heat release structure is connected to the at least one of the heat-releasing fin, the heat-releasing fan, and the heat pipe.

2. The LCD of claim 1, further comprising:
the heat-releasing fin; and
the heat pipe,
wherein the heat release structure is connected to the heat-releasing fin and the heat pipe.

3. The LCD of claim 1, further comprising:
the heat-releasing fin; and
the heat-releasing fan,
wherein the heat release structure is connected to the heat-releasing fin and the heat-releasing fan.

4. The LCD of claim 1, further comprising:
the heat-releasing fan; and
the heat pipe,
wherein the heat release structure is connected to the heat-releasing fan and the heat pipe.

5. The LCD of claim 1, further comprising:
the heat-releasing fin;
the heat-releasing fan; and
the heat pipe,
wherein the heat release structure is connected to the heat-releasing fin, the heat-releasing fan, and the heat pipe.

6. The LCD of claim 1, wherein the heat release structure is formed of copper, indium tin oxide, or graphene.

* * * * *